US012769174B2

(12) United States Patent
Nishino

(10) Patent No.: US 12,769,174 B2
(45) Date of Patent: Oct. 20, 2026

(54) ELECTROCHROMIC SHEET, LENS FOR EYEGLASSES, AND EYEGLASSES

(71) Applicant: SUMITOMO BAKELITE CO., LTD., Tokyo (JP)

(72) Inventor: Satoshi Nishino, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 198 days.

(21) Appl. No.: 18/847,499

(22) PCT Filed: Mar. 30, 2023

(86) PCT No.: PCT/JP2023/013068
§ 371 (c)(1),
(2) Date: Sep. 16, 2024

(87) PCT Pub. No.: WO2023/190819
PCT Pub. Date: Oct. 5, 2023

(65) Prior Publication Data

US 2025/0208475 A1 Jun. 26, 2025

(30) Foreign Application Priority Data

Mar. 31, 2022 (JP) ................................ 2022-061257

(51) Int. Cl.
*G02F 1/15* (2019.01)
*G02C 7/10* (2006.01)
(Continued)

(52) U.S. Cl.
CPC ............ *G02F 1/155* (2013.01); *G02C 7/101* (2013.01); *G02F 1/161* (2013.01); *G02F 1/163* (2013.01)

(58) Field of Classification Search
CPC .......... G02F 1/155; G02F 1/161; G02F 1/163; G02F 1/15; G02F 1/1676; G02C 7/101
See application file for complete search history.

(56) References Cited

U.S. PATENT DOCUMENTS

| | | | | |
|---|---|---|---|---|
| 5,818,625 A * | 10/1998 | Forgette | B60Q 1/2665 | |
| | | | 359/267 | |
| 10,509,290 B2 * | 12/2019 | Kim | G02F 1/155 | |

(Continued)

FOREIGN PATENT DOCUMENTS

| | | |
|---|---|---|
| EP | 3364242 A1 | 8/2018 |
| EP | 3712695 A1 | 9/2020 |

(Continued)

OTHER PUBLICATIONS

International Search Report dated Jun. 13, 2023, issued in counterpart International Application No. PCT/JP2023/013068 (2 pages).

*Primary Examiner* — Balram T Parbadia
(74) *Attorney, Agent, or Firm* — WHDA, LLP

(57) ABSTRACT

The electrochromic sheet includes the electrochromic element; and a lens for eyeglasses, which includes the electrochromic sheet and has excellent reliability, and eyeglasses with excellent productivity. An electrochromic sheet 150 of the present invention includes substrates 11 and 12, a sealing portion 55 disposed therebetween and defining a colored region 70, an electrochromic element 60 disposed in the colored region 70, and a first conductive portion 17 filling a first hole portion 53 and a second conductive portion 18 filling a second hole portion 54, which are formed on an outer side of the sealing portion 55 with respect to the electrochromic element 60, in which the conductive portions 17 and 18 are each exposed at different positions on edge parts of the electrochromic sheet 150.

11 Claims, 5 Drawing Sheets

(51) Int. Cl.
*G02F 1/155* (2006.01)
*G02F 1/161* (2006.01)
*G02F 1/163* (2006.01)

(56) References Cited

U.S. PATENT DOCUMENTS

| | | | |
|---|---|---|---|
| 2009/0305049 A1 | 12/2009 | Kobuchi et al. | |
| 2013/0286458 A1* | 10/2013 | Lamine | G02F 1/155 427/58 |
| 2014/0168746 A1* | 6/2014 | Yamamoto | G02B 5/003 359/275 |
| 2015/0251604 A1* | 9/2015 | Kukita | G02F 1/157 359/266 |
| 2017/0235203 A1 | 8/2017 | Yamamoto et al. | |
| 2018/0307112 A1 | 10/2018 | Park et al. | |
| 2019/0041712 A1* | 2/2019 | Liu | G02F 1/1525 |
| 2020/0301227 A1 | 9/2020 | Takahashi et al. | |
| 2022/0035217 A1 | 2/2022 | Kim et al. | |

FOREIGN PATENT DOCUMENTS

| | | | |
|---|---|---|---|
| JP | 7-209677 | A | 8/1995 |
| JP | 2009-294445 | A | 12/2009 |
| JP | 2016-45464 | A | 4/2016 |
| JP | 2020-154175 | A | 9/2020 |
| JP | 2020-160442 | A | 10/2020 |

* cited by examiner

ELECTROCHROMIC SHEET, LENS FOR EYEGLASSES, AND EYEGLASSES

TECHNICAL FIELD

The present invention relates to an electrochromic sheet, a lens for eyeglasses, and eyeglasses.

BACKGROUND ART

As a lens provided in eyewear such as eyeglasses and sunglasses, a lens which has, on a surface thereof, a polarized film having polarization or an optical sheet including a half-mirror layer capable of imparting design properties by selectively reflecting light in a specific wavelength range has been proposed.

That is, in order to impart a target optical characteristic to the lens, a lens having an optical sheet having such an optical characteristic on a surface thereof has been proposed.

The lens having such an optical sheet on a surface thereof is manufactured, for example, as follows. First, an optical sheet having a flat plate shape in a plan view is prepared, and protective films are attached to both surfaces of the optical sheet. In this state, the optical sheet is punched out as an individualized sheet which is individualized in a predetermined shape such as a circular shape in a plan view. Thereafter, a bent sheet is obtained by subjecting the individualized sheet to a thermal bending processing under heating to form a bent convex surface and a bent concave surface, which are formed into a bent shape by the thermal bending. Next, the protective films are peeled off from the bent sheet, and the bent sheet is sucked and held in a state in which a concave portion having a bent shape is in close contact with a mold concave portion of a mold. In this state, a resin layer (molded layer) formed of a resin material as a main material is formed on the concave surface of the bent sheet by an insert injection molding method or the like. As a result, the lens having an optical sheet on a surface thereof is manufactured (see, for example, PTL 1).

Separately from this, reversible oxidation-reduction reaction occurs by applying a voltage, and a phenomenon in which color is reversibly changed is referred to as electrochromism. In recent years, an electrochromic element using an electrochromic material exhibiting the electrochromism has been proposed (see, for example, PTL 2).

The electrochromic element is colored by applying a positive voltage, and is decolored by applying a negative voltage to be transparent. Therefore, by providing a switch capable of switching between the application of a positive voltage and the application of a negative voltage to the electrochromic element, the coloration and decoloration in the electrochromic element can be performed at any timing.

Accordingly, it is considered that, by adopting the electrochromic element to the above-described optical sheet, that is, by using an electrochromic sheet including the electrochromic element as the optical sheet, it is possible to provide eyewear such as eyeglasses and sunglasses, including lenses in which coloration and decoloration can be switched at any timing by switching ON/OFF of a switch.

Therefore, in a case where the lens having an electrochromic sheet on a surface thereof is manufactured using the manufacturing method of a lens using the optical sheet described above, in order to manufacture the lens with favorable yield, it is required to find out whether or not a failure (error) has occurred in the electrochromic element provided in the individualized sheet punched out to be individualized or in the bent sheet having a bent shape by the thermal bending.

However, in the electrochromic sheet, it has not been taken into consideration in the current situation that it is possible to easily find out the presence or absence of the occurrence of a failure in the electrochromic element provided in the individualized sheet or the bent sheet obtained in the middle of the manufacturing process of the lens.

CITATION LIST

Patent Literature

[PTL 1] JP2009-294445A
[PTL 2] JP2016-45464A

SUMMARY OF INVENTION

Technical Problem

An object of the present invention is to provide an electrochromic sheet which is configured such that it is possible to easily find out the presence or absence of occurrence of a failure in an electrochromic element during a manufacturing process in a case of manufacturing a lens including the electrochromic sheet, the electrochromic sheet including the electrochromic element which contains an electrochromic material exhibiting electrochromism; and a lens for eyeglasses, which includes the electrochromic sheet and has excellent reliability, and eyeglasses with excellent productivity.

Solution to Problem

Such objects can be achieved by the present invention described in the following items (1) to (11).

(1) An electrochromic sheet including:

a first substrate;

a second substrate which is disposed to face the first substrate;

a sealing portion which is disposed between the first substrate and the second substrate and defines a colored region exhibiting coloration by application of a voltage;

an electrochromic element which is disposed in the colored region; and on an outer side of the sealing portion with respect to the electrochromic element, a first conductive portion which is provided to fill a first hole portion formed from the first substrate side toward the second substrate side, and a second conductive portion which is provided to fill a second hole portion formed from the second substrate side toward the first substrate side, in which the electrochromic element includes a first electrode and a first electrochromic layer, which are sequentially laminated on the first substrate toward the second substrate side, a second electrode and a second electrochromic layer, which are sequentially laminated on the second substrate toward the first substrate side, and an electrolyte layer which is filled between the first electrochromic layer and the second electrochromic layer, in which the first electrochromic layer contains, as a main material, a material exhibiting coloration by an oxidation reaction, in which the second electrochromic layer contains, as a main material, a material exhibiting coloration by a reduction reaction, in which the first electrode is provided between the first substrate and the sealing portion to the first conductive portion with a patterning that, in a plan view of the electrochromic sheet, the first electrode extends from the colored region and reaches to the first conductive portion to be electrically connected to the first conductive portion, in which the second electrode is provided between the second substrate and the sealing portion to the second conductive portion with a patterning that, in the plan view of the electrochromic sheet, the second electrode extends from the colored region and reaches to the second conductive portion to be electrically connected to the second conductive portion, and in which the first conductive portion and the second conductive portion are each exposed at different positions at edge parts along a thickness direction of the electrochromic sheet.

(2) The electrochromic sheet according to (1), further including:

in the plan view of the electrochromic sheet, a third conductive portion which is provided to fill a third hole portion formed from the first substrate side toward the second substrate side between the first conductive portion and the electrochromic element, in which the first electrode is further electrically connected to the third conductive portion.

(3) The electrochromic sheet according to (2), further including:

a first auxiliary electrode which is provided between the first electrode and the first conductive portion to the third conductive portion to electrically connect the first electrode to the first conductive portion and the third conductive portion.

(4) The electrochromic sheet according to (2) or (3), in which the first hole portion and the third hole portion are through-holes penetrating the sealing portion in the thickness direction.

(5) The electrochromic sheet according to any one of (1) to (4), further including:

in the plan view of the electrochromic sheet, a fourth conductive portion which is provided to fill a fourth hole portion formed from the second substrate side toward the first substrate side between the second conductive portion and the electrochromic element, in which the second electrode is further electrically connected to the fourth conductive portion.

(6) The electrochromic sheet according to (5), further including:

a second auxiliary electrode which is provided between the second electrode and the second conductive portion to the fourth conductive portion to electrically connect the second electrode to the second conductive portion and the fourth conductive portion.

(7) The electrochromic sheet according to (5) or (6), in which the second hole portion and the fourth hole portion are through-holes penetrating the sealing portion in the thickness direction.

(8) The electrochromic sheet according to any one of (1) to (7), in which the first conductive portion and the second conductive portion each independently have an average thickness of 20 μm or more and 100 μm or less.

(9) The electrochromic sheet according to any one of (1) to (8), in which the first electrode and the second electrode each independently have an average thickness of 50 nm or more and 200 nm or less.

(10) A lens for eyeglasses, including:

the electrochromic sheet according to any one of (1) to (9), in which the electrochromic sheet is provided as a cut piece which has been formed into a bent shape and cut out to correspond a lens shape.

(11) Eyeglasses including:

the lens for eyeglasses according to (10).

Advantageous Effects of Invention

According to the present invention, in the electrochromic sheet including the electrochromic element, the first conductive portion and the second conductive portion, which are electrically connected to the first electrode and the second electrode included in the electrochromic element, are each exposed at different positions at edge parts along a thickness direction of the electrochromic sheet. Therefore, in the middle of manufacturing of a lens for eyeglasses, by applying a voltage between the first electrode and the second electrode through the first conductive portion and the second conductive portion, it is possible to easily find out the presence or absence of occurrence of a failure in the electrochromic element provided in the inside of the electrochromic sheet. That is, the electrochromic element can be easily examined in the middle of the manufacturing of the lens for eyeglasses.

DESCRIPTION OF EMBODIMENTS

Figure 1:
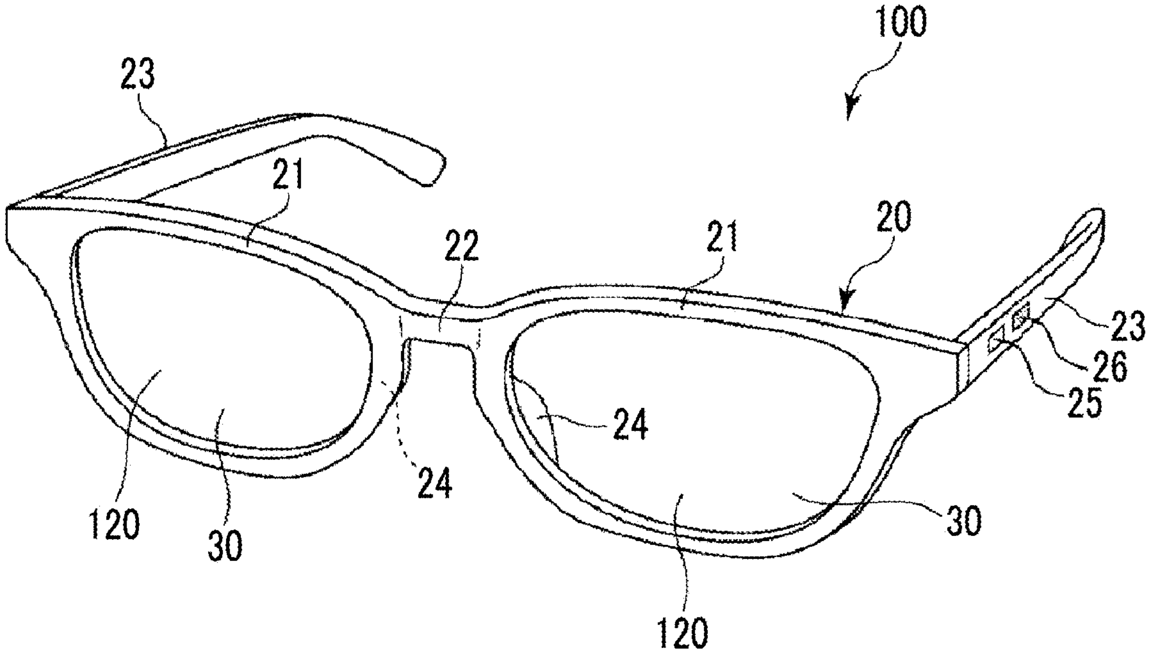
FIG. 1 is a perspective view showing an embodiment of sunglasses including a lens having a bent sheet in which an electrochromic sheet according to an embodiment of the present invention is formed into a bent shape.

Hereinafter, the electrochromic sheet, the lens for eyeglasses, and the eyeglasses according to the embodiment of the present invention will be described in detail with reference to suitable embodiments shown in the accompanying drawings.

The electrochromic sheet according to the embodiment of the present invention includes a first substrate; a second substrate which is disposed to face the first substrate; a sealing portion which is disposed between the first substrate and the second substrate and defines a colored region exhibiting coloration by application of a voltage; an electrochromic element which is disposed in the colored region; and on an outer side of the sealing portion with respect to the electrochromic element, a first conductive portion which is provided to fill a first hole portion formed from the first substrate side toward the second substrate side, and a second conductive portion which is provided to fill a second hole portion formed from the second substrate side toward the first substrate side. The electrochromic element includes a first electrode and a first electrochromic layer, which are sequentially laminated on the first substrate toward the second substrate side, a second electrode and a second electrochromic layer, which are sequentially laminated on the second substrate toward the first substrate side, and an electrolyte layer which is filled between the first electrochromic layer and the second electrochromic layer. In addition, the first electrochromic layer contains, as a main material, a material exhibiting coloration by an oxidation reaction, and the second electrochromic layer contains, as a main material, a material exhibiting coloration by a reduction reaction. In addition, the first electrode is provided between the first substrate and the sealing portion to the first conductive portion with a patterning that, in a plan view of the electrochromic sheet, the first electrode extends from the colored region and reaches to the first conductive portion to be electrically connected to the first conductive portion. In addition, the second electrode is provided between the second substrate and the sealing portion to the second conductive portion with a patterning that, in the plan view of the electrochromic sheet, the second electrode extends from the colored region and reaches to the second conductive portion to be electrically connected to the second conductive portion. Furthermore, the first conductive portion and the second conductive portion are each exposed at different positions at edge parts along a thickness direction of the electrochromic sheet.

As described above, in the electrochromic sheet including the electrochromic element of the present invention, the first conductive portion and the second conductive portion, which are electrically connected to the first electrode and the second electrode included in the electrochromic element, are each exposed at different positions at edge parts along a thickness direction of the electrochromic sheet. Therefore, in the middle of manufacturing of a lens for eyeglasses using the electrochromic sheet according to the embodiment of the present invention, by applying a voltage between the first electrode and the second electrode through the first conductive portion and the second conductive portion, it is possible to easily find out the presence or absence of occurrence of a failure in the electrochromic element provided in the inside of the electrochromic sheet.

In a case of manufacturing a lens for eyeglasses using the electrochromic sheet according to the embodiment of the present invention, the bent sheet in which the electrochromic sheet is formed into a bent shape by subjecting the electrochromic sheet to a thermal bending processing under heating is used as the lens having a bent shape, for example, as an optical sheet of the lens provided in sunglasses (lens for eyeglasses), in which coloration and decoloration can be switched at any timing by switching ON/OFF of a switch provided in the sunglasses. Hereinafter, first, the sunglasses will be described before the electrochromic sheet according to the embodiment of the present invention is described.

<Sunglasses>

FIG. 1 is a perspective view showing an embodiment of sunglasses including the lens having a bent sheet in which the electrochromic sheet according to the embodiment of the present invention is formed into a bent shape. In FIG. 1, when the sunglasses are worn on a head portion of a user, a surface of the lens on an eye-side of the user is referred to as a back side surface, and a surface on an opposite side thereof is referred to as a front side surface.

As shown in FIG. 1, sunglasses 100 include a frame 20 and a lens (lens for eyeglasses) 30.

In the present specification, the term "lens (lens for eyeglasses)" includes both a lens having a light collecting function and a lens not having a light collecting function.

The frame 20 is configured to be worn on the head portion of the user and to dispose the lens 30 in the vicinity of the front of the eyes of the user.

The frame 20 has a rim portion 21, a bridge portion 22, a temple portion 23, and a nose pad portion 24.

The rim portion 21 has a ring shape, and one rim portion is provided for each of the right eye and the left eye to correspond thereto, and the lens 30 is installed inside. As a result, the user can visually recognize external information through the lens 30.

The lens 30 includes a bent sheet 120 in which an electrochromic sheet 150 according to the embodiment of the present invention is formed into a bent shape by performing a thermal bending processing, and is configured such that coloration and decoloration can be performed at any timing in a reversible manner by switching application of a voltage to the electrochromic element 60 in the electrochromic sheet 150. In addition, the lens 30 includes a connection terminal at a position corresponding to a connection portion in which the bridge portion 22 and the temple portion 23 are connected to the rim portion 21 respectively in a case of being mounted on an inner side of the rim portion 21, and the connection terminal is electrically connected to a switch 25 and a battery 26, which will be described below, provided in the temple portion 23 through a wiring.

In addition, the bridge portion 22 has a rod shape, and is located in front of an upper part of a nose of the user when worn on the head portion of the user to connect the pair of the rim portions 21.

The temple portion 23 has a bow shape, and is connected to an edge portion on a side opposite to a location of each of the rim portions 21 to which the bridge portion 22 is connected. The temple portion 23 is hung on an ear of the user when worn on the head portion of the user.

The temple portion 23 includes a switch 25 which is exposed to be operable on a surface thereof, and an incorporated battery 26. The switch 25 and the battery 26 are electrically connected to the connection terminal provided in the lens 30 through a wiring. As a result, a positive voltage and a negative voltage can be applied to the electrochromic element 60 included in the bent sheet 120 in the lens 30, and the switching between the application of the voltage and the non-application of the voltage can be performed by the operation of the switch 25.

The nose pad portion 24 is provided on an edge portion of each of the rim portions 21 corresponding to the nose of the user when the sunglasses 100 are worn on the head portion of the user, abuts the nose of the user, and has a shape corresponding to an abutting portion of the nose. As a result, the worn state can be stably maintained.

A constituent material of each part constituting the frame 20 is not particularly limited, and various metal materials, various resin materials, and the like can be used, for example. A shape of the frame 20 is not limited to the illustrated shape as long as the shape is mountable on the head portion of the user.

The lens 30 (lens for eyeglasses according to the embodiment of the present invention) is mounted on each of the rim portions 21. The lens 30 is a member having light transmittance and having a plate-like overall shape which is bent toward the outside, and includes a resin layer 35 (molded layer) and the bent sheet 120 in which the electrochromic sheet 150 according to the embodiment of the present invention is formed into a bent shape having a bent convex surface and a bent concave surface by the thermal bending processing under heating.

The resin layer 35 has light transmittance, is located on the back side of the lens, and has a light collecting function in a case of imparting a light collecting function to the lens 30.

A constituent material of the resin layer 35 is not particularly limited as long as it is a resin material having light transmittance, and examples thereof include various thermoplastic resins and various curable resins such as a thermosetting resin and a photocurable resin. Among these, one or two or more kinds thereof can be used in combination.

Examples of the resin material include polyolefins such as polyethylene, polypropylene, and an ethylene-propylene copolymer, polyvinyl chloride, polystyrene, polyamide, polyimide, polycarbonate, poly-(4-methylpentene-1), ionomer, an acrylic resin, polymethyl methacrylate, an acrylonitrile-butadiene-styrene copolymer (ABS resin), an acrylonitrile-styrene copolymer (AS resin), a butadiene-styrene copolymer, polyesters such as polyethylene terephthalate (PET) and polybutylene terephthalate (PBT), polyether, polyether ketone (PEK), polyether ether ketone (PEEK), polyetherimide, polyacetal (POM), polyphenylene oxide, polysulfone, polyethersulfone, polyphenylene sulfide, polyarylate, aromatic polyester (liquid crystal polymer), polytetrafluoroethylene, polyvinylidene fluoride, other fluororesins, an epoxy resin, a phenol resin, a urea resin, a melamine resin, a silicone resin, polyurethane; and copolymers, blend materials, polymer alloys mainly composed of these resins. Among these, it is preferable that the resin material is the same type or the same as a resin material constituting, as a main material, a first substrate 11 included in the bent sheet 120, which will be described later. As a result, it is possible to improve adhesiveness between the resin layer 35 and the bent sheet 120. In addition, since a difference in refractive index between the resin layer 35 and the bent sheet 120 (first substrate 11) can be set to be low, it is possible to accurately suppress or prevent light from being scattered and reflected between the resin layer 35 and the bent sheet 120, and thus the light can be transmitted between the resin layer 35 and the bent sheet 120 with excellent light transmittance. The difference in refractive index between the resin layer 35 and the first substrate 11 included in the bent sheet 120 is preferably 0.2 or less and more preferably 0.1 or less. As a result, an effect obtained by setting the above-described difference in refractive index to be low can be more remarkably exhibited.

A thickness of the resin layer 35 is not particularly limited, and is preferably 0.5 mm or more and 5.0 mm or less, and more preferably 1.0 mm or more and 3.0 mm or less, for example. As a result, it is possible to achieve both relatively high intensity and weight reduction in the lens 30.

The bent sheet 120 is constituted of the electrochromic sheet 150 which is joined to a surface of the resin layer 35 on the outer side, that is, the bent convex surface, in a bent shape corresponding to such a shape. By providing the bent sheet 120 in the lens 30, the sunglasses 100 has a function of reversibly performing the coloration and decoloration at any timing by switching the application of the voltage to the electrochromic element 60 included in the electrochromic sheet 150. As described above, the configuration of the bent sheet 120 in which the electrochromic sheet 150 according to the embodiment of the present invention is formed into a bent shape is adopted, and the electrochromic sheet 150 will be described in detail later.

As described above, the lens 30 included in the sunglasses 100 may be a lens having a light collecting function or a lens not having a light collecting function.

In addition, from the viewpoint of fashionability, lightness, and the like, the sunglasses 100 may have a configuration without the frame, in addition to the configuration having the frame 20 as described above.

Furthermore, in the present embodiment, the eyeglasses including the lens 30 are applied to the sunglasses 100, but the present invention is not limited to this, and the eyeglasses may be, for example, eyeglasses with a prescription, fake eyeglasses, and goggles that protect the eyes from wind, rain, dust, garbage, chemicals, and the like.

In the sunglasses 100 (eyeglasses) having the above-described configuration, the lens 30 included in the sunglasses 100 is manufactured, for example, by a manufacturing method of the lens 30 as shown below.

<Manufacturing Method of Lens>

Figure 3:
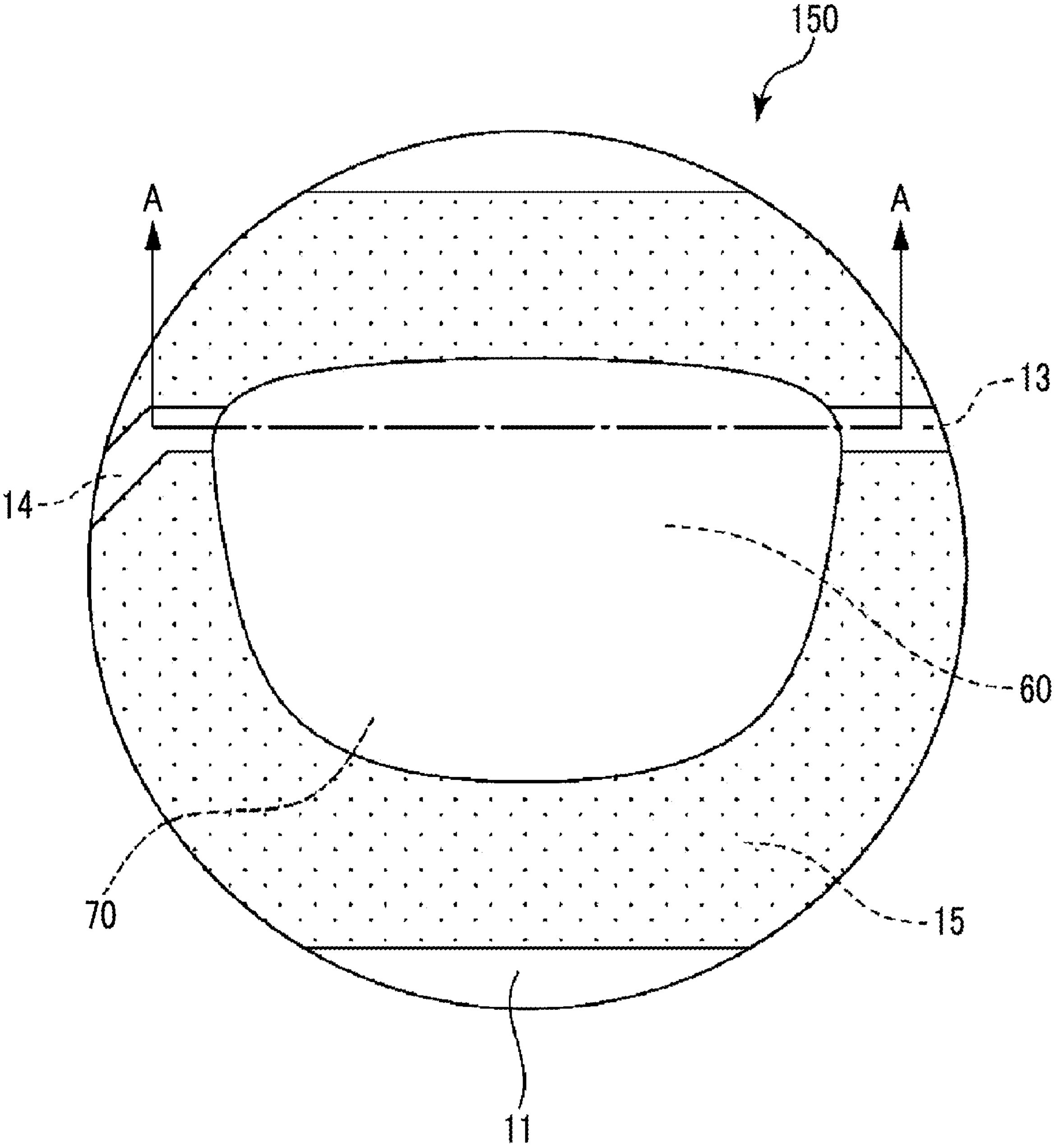
FIG. 3 is a plan view showing the embodiment of the electrochromic sheet according to the present invention.
Figure 4:
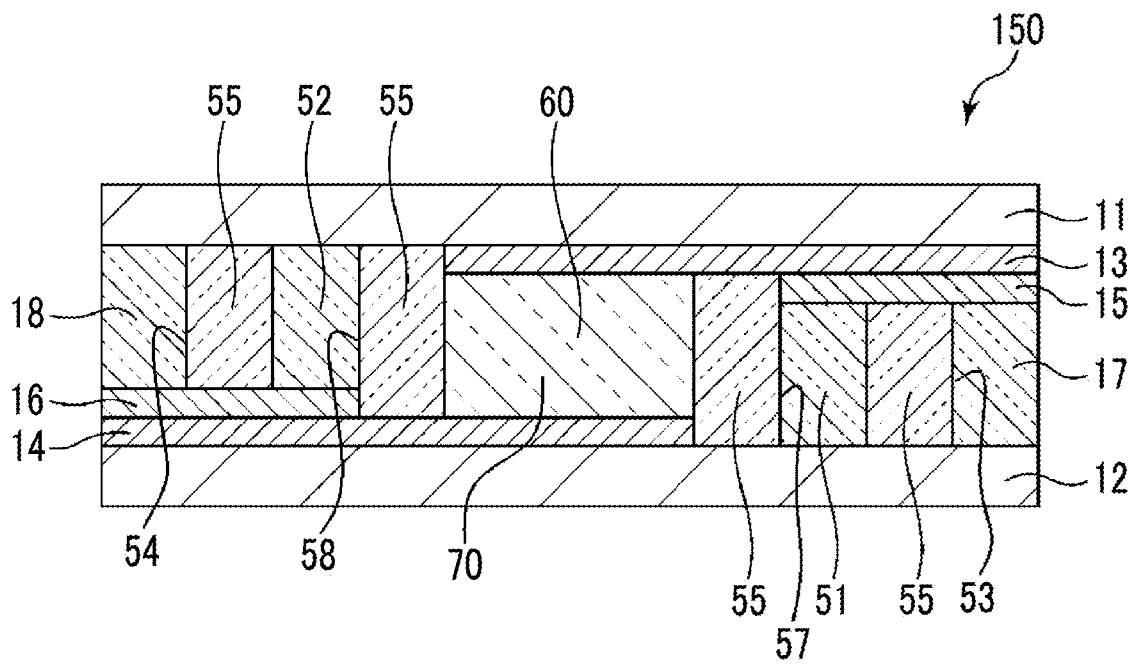
FIG. 4 is a longitudinal cross-sectional view taken along a line A-A in a main part of the electrochromic sheet shown in FIG. 3.
Figure 5:
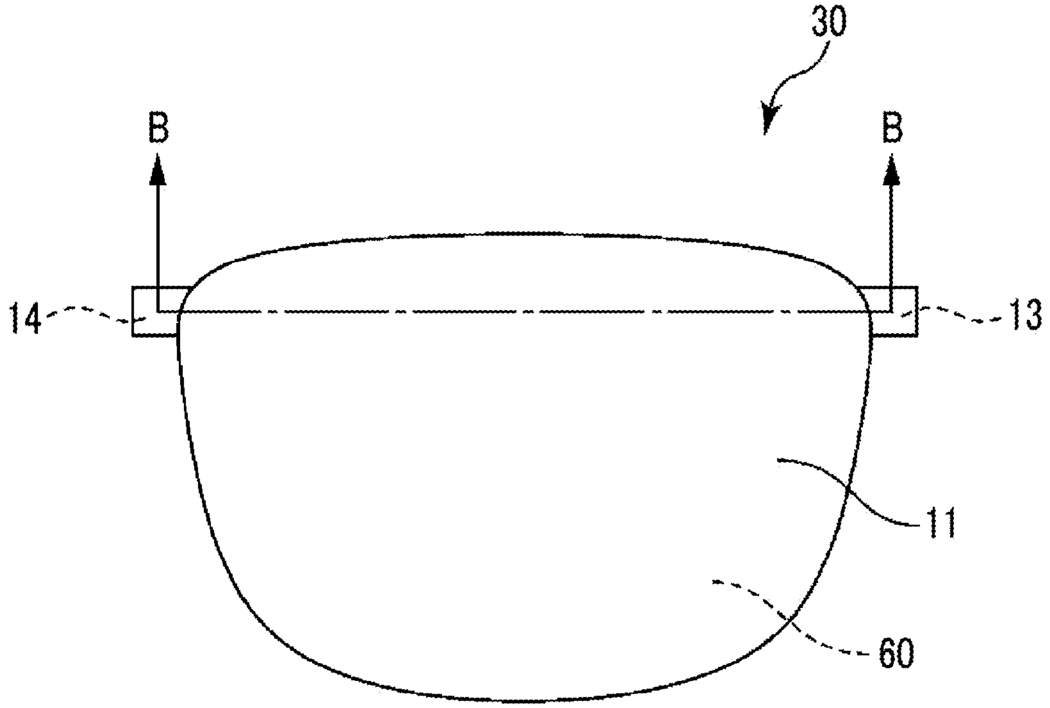
FIG. 5 is a plan view showing the lens having a bent sheet.
Figure 6:
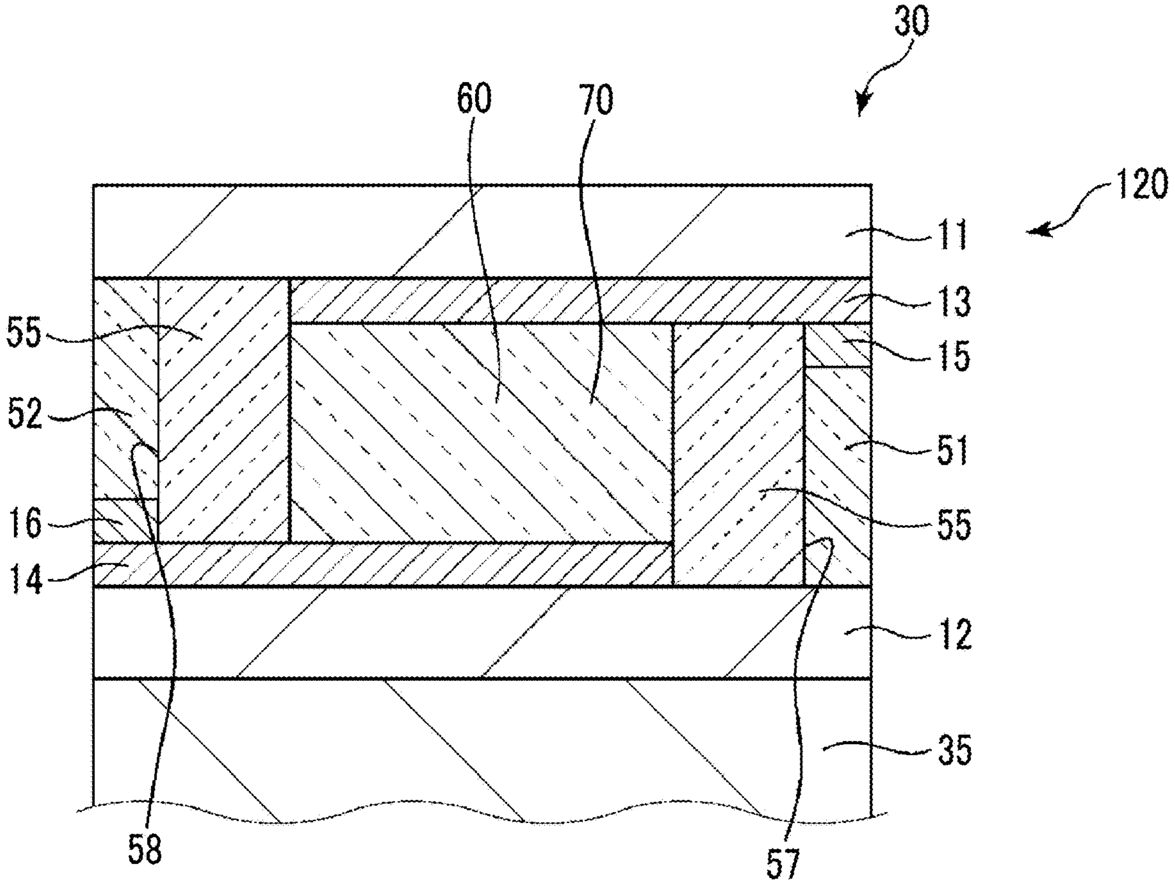
FIG. 6 is a longitudinal cross-sectional view taken along a line B-B in the main part of the lens shown in FIG. 5.
Figure 7:
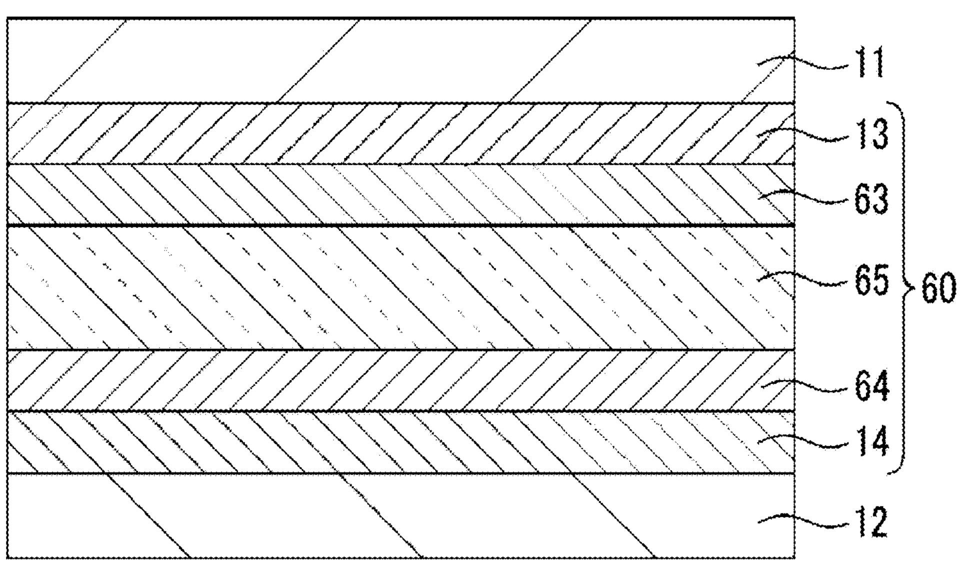
FIG. 7 is a longitudinal cross-sectional view showing the electrochromic sheet shown in FIG. 3 and an electrochromic element provided in the lens shown in FIG. 5.

FIGS. 2A to 2D are schematic views for describing the manufacturing method of the lens having a bent sheet in which the electrochromic sheet according to the embodiment of the present invention is formed into a bent shape. FIG. 3 is a plan view showing the embodiment of the electrochromic sheet according to the present invention. FIG. 4 is a longitudinal cross-sectional view taken along a line A-A in a main part of the electrochromic sheet shown in FIG. 3. FIG. 5 is a plan view showing the lens having a bent sheet. FIG. 6 is a longitudinal cross-sectional view taken along a line B-B in the main part of the lens shown in FIG. 5. FIG. 7 is a longitudinal cross-sectional view showing the electrochromic sheet shown in FIG. 3 and an electrochromic element provided in the lens shown in FIG. 5. In the following, for convenience of description, the upper side of FIGS. 2A to 2D, 4, 6, and 7 and the front side of the paper of FIGS. 3 and 5 are referred to as "up"; and the lower side of FIGS. 2A to 2D, 4, 6, and 7 and the back side of the paper of FIGS. 3 and 5 are referred to as "down". In addition, in FIG. 6, the bent sheet 120 actually has a bent shape, but is described as having a flat plate shape for convenience of description.

Hereinafter, each step of the manufacturing method of the lens 30 including the bent sheet 120 having the bent shape of the electrochromic sheet 150 according to the embodiment of the present invention will be described in detail.

[1] First, an element-sealing linking sheet 110 which includes a first substrate 11, a second substrate 12, a sealing portion 55, and an electrochromic element 60, in which a plurality of electrochromic elements 60 provided corresponding to a colored region 70 defined by the sealing portion 55 are sandwiched between the first substrate 11 and the second substrate 12, is prepared. In the element-sealing linking sheet 110, the plurality of electrochromic elements 60 are connected to each other between the first substrate 11 and the second substrate 12 through the sealing portion 55, and the first substrate 11, the second substrate 12, and the sealing portion 55 are sealed.

Figure 2A:
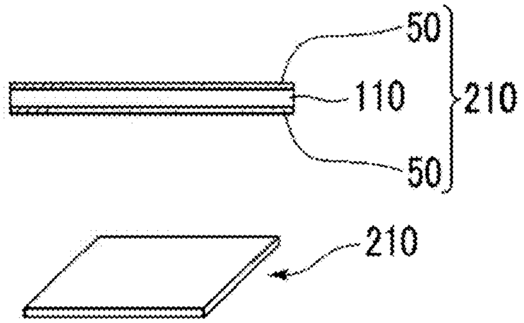
FIGS. 2A to 2D are schematic views for describing a manufacturing method of the lens having a bent sheet in which the electrochromic sheet according to the embodiment of the present invention is formed into a bent shape.

By attaching protective films 50 (masking tapes) to both surfaces of the element-sealing linking sheet 110, the protective films 50 are attached to both surfaces of the element-sealing linking sheet 110 to obtain a coupling sheet laminate 210 (see FIG. 2A).

Figure 2B:
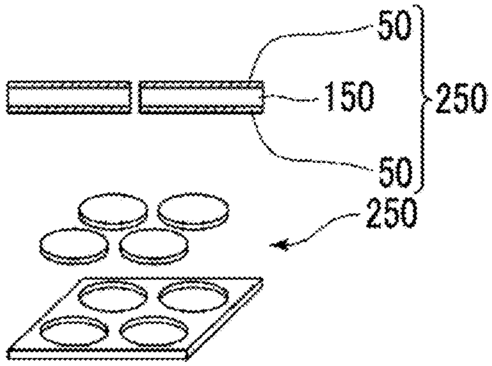

[2] Next, as shown in FIG. 2B, the prepared coupling sheet laminate 210, that is, the element-sealing linking sheet 110 in a state in which the protective films 50 are attached to both surfaces of the element-sealing linking sheet 110 is punched in a thickness direction thereof corresponding to each electrochromic element 60. As a result, the coupling sheet laminate 210 is individualized to obtain an element laminate 250 having a circular shape in a plan view. That is, the electrochromic sheet 150 is obtained in a state in which the protective films 50 are attached to both surfaces and the electrochromic sheet 150 is individualized in a circular shape corresponding to each electrochromic element 60 (see FIGS. 3 and 4).

Figure 2C:
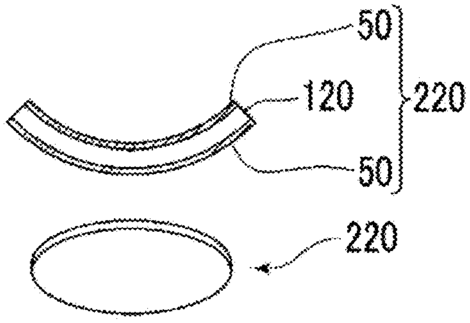

[3] Next, as shown in FIG. 2C, a thermal bending processing is performed on the element laminate 250 individualized in a circular shape under heating, thereby forming a bent element laminate 220 having a bent shape in which one surface side is a bent concave surface and the other surface side is a bent convex surface. As a result, the electrochromic sheet 150 having a flat plate shape can be formed into the bent sheet 120 having a bent shape in a state in which the protective films 50 are attached to both surfaces.

The thermal bending processing is typically carried out by press molding or vacuum molding.

As described later, in the present embodiment, a heating temperature (molding temperature) of the element laminate 250 (electrochromic sheet 150) in this case is set to preferably approximately 110° C. or higher and 170° C. or lower and more preferably approximately 130° C. or higher and 160° C. or lower, in consideration of the fact that the electrochromic sheet 150 includes the substrates 11 and 12 and the fact of melting or softening temperature of the substrates 11 and 12. By setting the heating temperature within a certain range, the electrochromic sheet 150 can be softened or melted while preventing degeneration and deterioration of the electrochromic sheet 150, and the electrochromic sheet 150 can be reliably thermally bent to form the bent sheet 120 having a bent shape.

Figure 2D:
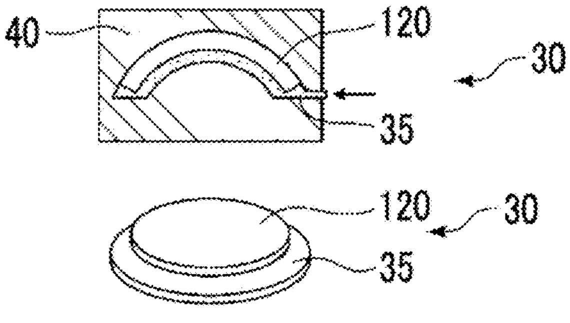

[4] Next, the protective films 50 are peeled off from the bent sheet 120 which has been subjected to the thermal bending. Thereafter, as shown in FIG. 2D, by an insert injection molding method or the like, the resin layer 35 (molded layer) formed of a resin material as a main material is injection-molded onto the bent concave surface of the bent sheet 120 in a state in which the bent sheet 120 is adsorbed to a mold 40 including the bent concave surface serving as the bent shape, such that the bent concave surface of the mold 40 and the bent convex surface of the bent sheet 120 are in contact with each other. That is, the constituent material of the resin layer 35 in a molten state is cooled and solidified in a state of being in contact with the bent concave surface of the bent sheet 120, so that the resin layer 35 is directly brought into contact with the bent concave surface of the bent sheet 120 without using an adhesive layer or the like. As a result, the lens 30 (lens for eyeglasses according to the embodiment of the present invention) including the bent sheet 120 which is thermally bent and the resin layer 35 is manufactured.

A heating temperature (molding temperature) of the constituent material of the resin layer 35, for maintaining the constituent material in a molten state in a case of performing the injection molding of the resin layer 35, is appropriately set according to the type of the constituent material of the resin layer 35, and in a case where the constituent material of the resin layer 35 is the same type or the same as a constituent material of the first substrate 11 included in the bent sheet 120, which will be described later, it is set to preferably approximately 180° C. or higher and 320° C. or lower and more preferably approximately 230° C. or higher and 300° C. or lower. By setting the heating temperature within a certain range, the constituent material of the resin layer 35 in a molten state can be reliably supplied to the bent concave surface of the bent sheet 120.

In addition, among insert injection molding methods, an injection compression molding method is preferably used. The injection compression molding method is a method of injecting the resin material for forming the resin layer 35 into the mold 40 at a low pressure and then closing the mold 40 at a high pressure to apply a compression force to the resin material, so that the injection compression molding method is preferably used because the resin layer 35 as a molded article, that is, the lens 30 is less likely to cause optical anisotropy due to molding distortion or local alignment of resin molecules during the molding. In addition, by controlling the mold compression force uniformly applied to the resin material, the resin material can be cooled with a constant specific volume, so that the resin layer 35 having high dimensional accuracy can be obtained.

Next, as shown in FIG. 5, the manufactured lens 30 is subjected to a trimming processing of cutting an edge portion thereof, and a cut piece having a shape which matches the shape of the inside of the rim portion 21 is obtained. Thereafter, the lens 30 (cut piece) is mounted on the inside of the rim portion 21 to be used as the sunglasses 100.

In the manufacturing method of the lens 30 through the above-described steps, the electrochromic sheet 150 is obtained by performing the above-described step [2], and the element-sealing linking sheet 110 is individually formed in a circular shape. The electrochromic sheet 150 thus obtained may have a bent shape due to the formation of the bent sheet 120 by the thermal bending processing of the electrochromic sheet 150 in the above-described step [3] or the formation of the resin layer 35 on the bent concave surface of the bent sheet 120 in the above-described step [4] in which the electrochromic sheet 150 is formed into a bent shape, or may have a failure (error) in the electrochromic element 60 included in the inside of the electrochromic sheet 150 due to the thermal history. Therefore, in a case where it is possible to find out the presence or absence of the failure in the electrochromic element 60 included in the electrochromic sheet 150 after the above-described step [3] and after the above-described step [4], that is, in a case where it is possible to easily perform inspection of the electrochromic element 60, the sunglasses 100 can be produced with a high yield.

In response to such a request, in the electrochromic sheet 150 according to the embodiment of the present invention, a first conductive portion 17 and a second conductive portion 18 electrically connected to a first electrode 13 and a second electrode 14 provided in the electrochromic element 60 are exposed at different positions in edge parts of the electrochromic sheet 150 along a thickness direction of the electrochromic sheet 150.

Therefore, by applying, after the above-described step [3] or after the above-described step [4], a voltage between the first electrode 13 and the second electrode 14 through the first conductive portion 17 and the second conductive portion 18 exposed at the edge parts along the thickness direction of the electrochromic sheet 150, it is possible to easily perform the inspection of the electrochromic element 60 included in the inside of the inside of the electrochromic sheet 150. Therefore, it is possible to easily find out the presence or absence of the occurrence of the failure in the electrochromic element 60 provided in the inside of the electrochromic sheet 150. Therefore, the lens 30 and the sunglasses 100 can be produced with a high yield, that is, the lens 30 and the sunglasses 100 having excellent reliability can be produced with excellent productivity. Hereinafter, the electrochromic sheet 150 will be described in detail.

<Electrochromic Sheet>

As shown in FIGS. 3 and 4, an electrochromic sheet 150 in the present embodiment includes a first substrate 11, a second substrate 12, a sealing portion 55, an electrochromic element 60, a first conductive portion 17, a second conductive portion 18, a third conductive portion 51, a fourth conductive portion 52, a first auxiliary electrode 15, and a second auxiliary electrode 16.

Hereinafter, each member constituting the electrochromic sheet 150 will be described.

The first substrate 11 supports other members including the electrochromic element 60, constitutes an outermost layer of the electrochromic sheet 150, which allows other members including the electrochromic element 60 to be placed between the first substrate 11 and the second substrate 12, and has a function of protecting the electrochromic element 60 and the like.

In the electrochromic sheet 150, the first substrate 11 and the second substrate 12 constitute the outermost layers of the electrochromic sheet 150, so that the other members including the electrochromic element 60 are not exposed on the surface of the electrochromic sheet 150. Therefore, in a case where the bent sheet 120 in which the electrochromic sheet 150 is formed into a bent shape is applied as the component of the lens 30, it is possible to reliably prevent sand and dust, or the like from colliding with the electrochromic element 60, or the electrochromic element 60 from being abraded by the other members or the like. Therefore, it is possible to reliably prevent the collision or the friction from adversely affecting the characteristics of the electrochromic element 60.

The first substrate 11 is not particularly limited as long as it is formed of a resin material having transparency as a main material, and preferably contains a transparent resin (base resin) having thermoplasticity as a main material. The main material refers to a material having a content of 50% by mass or more in the constituent elements.

The transparent resin is not particularly limited, and examples thereof include an acrylic resin, a polystyrene-based resin, a polyethylene-based resin, a polypropylene-based resin, a polyester-based resin such as polyethylene terephthalate (PET) and polyethylene naphthalate (PEN), a polycarbonate-based resin, a polyamide-based resin, a cycloolefin-based resin, a vinyl chloride-based resin, and a polyacetal-based resin; and one kind or two or more kinds thereof can be used in combination. Among these, a polycarbonate-based resin or a polyamide-based resin is preferable, and a polycarbonate-based resin is particularly preferable. The polycarbonate-based resin is rich in mechanical strength such as transparency (light transmittance) and rigidity, and has high heat resistance. Therefore, by using the polycarbonate-based resin as the transparent resin, it is possible to improve the transparency of the first substrate 11, and the impact resistance and heat resistance of the first substrate 11.

As the polycarbonate-based resin, various resins can be used, and an aromatic polycarbonate-based resin is preferable. The aromatic polycarbonate-based resin includes an aromatic ring in the main chain thereof, and thus the first substrate 11 having more excellent strength can be obtained.

The aromatic polycarbonate-based resin is synthesized, for example, by an interfacial polycondensation reaction between bisphenol and phosgene, an ester exchange reaction between bisphenol and diphenyl carbonate, or the like.

Examples of the bisphenol include bisphenol A and a bisphenol (modified bisphenol) serving as an origin of a repeating unit of a polycarbonate represented by Formula (1A).

[Chem. 1]

(1A)

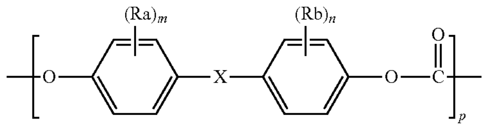

(in Formula (1A), X represents an alkyl group having 1 to 18 carbon atoms, an aromatic group, or a cyclic aliphatic group, Ra and Rb each independently represent an alkyl group having 1 to 12 carbon atoms, m and n each independently represent an integer of 0 to 4, and p represents the number of repeating units)

Specific examples of the above-described bisphenol serving as the origin of the repeating unit of the polycarbonate represented by Formula (1A) include 4,4'-(pentane-2,2-diyl)diphenol, 4,4'-(pentane-3,3-diyl)diphenol, 4,4'-(butane-2,2-diyl)diphenol, 1,1'-(cyclohexanediyl)diphenol, 2-cyclohexyl-1,4-bis(4-hydroxyphenyl)benzene, 2,3-bicyclohexyl-1,4-bis(4-hydroxyphenyl)benzene, 1,1'-bis(4-hydroxy-3-methylphenyl)cyclohexane, and 2,2'-bis(4-hydroxy-3-methylphenyl) propane; and one or two or more thereof can be used in combination.

As the polycarbonate-based resin, a bisphenol-type polycarbonate-based resin having a skeleton derived from bisphenol is particularly preferably used as a main component. By using such a bisphenol-type polycarbonate-based resin, the first substrate 11 exhibits more excellent strength.

In addition, as long as the first substrate 11 has light transmittance, the color thereof may be colorless or any color such as red, blue, and yellow.

These colors can be selected by containing a dye or a pigment in the first substrate 11. Examples of the dye include an acid dye, a direct dye, a reactive dye, and a basic dye; and one or two or more kinds selected from these dyes can be used in combination.

Specific examples of the dye include C. I. Acid Yellow 17, 23, 42, 44, 79, and 142; C. I. Acid Red 52, 80, 82, 249, 254, and 289; C. I. Acid Blue 9, 45, and 249; C. I. Acid Black 1, 2, 24, and 94; C. I. Food Black 1 and 2; C. I. Direct Yellow 1, 12, 24, 33, 50, 55, 58, 86, 132, 142, 144, and 173; C. I. Direct Red 1, 4, 9, 80, 81, 225, and 227; C. I. Direct Blue 1, 2, 15, 71, 86, 87, 98, 165, 199, and 202; C. I. Direct Black 19, 38, 51, 71, 154, 168, 171, and 195; C. I. Reactive Red 14, 32, 55, 79, and 249; and C. I. Reactive Black 3, 4, and 35.

The first substrate 11 may contain various additives such as an antioxidant, a filler, a plasticizer, a light stabilizer, an ultraviolet absorber, an infrared absorber, and a flame retardant as necessary, in addition to the transparent resin, the dye, and the pigment described above.

In addition, the first substrate 11 may or may not be stretched.

Furthermore, a refractive index of the first substrate 11 at a wavelength of 589 nm is preferably 1.3 or more and 1.8 or less, and more preferably 1.4 or more and 1.65 or less. By setting the refractive index n1 of the first substrate 11 to the above-described numerical range, it is possible to accurately suppress or prevent the inhibition of the function as the electrochromic element 60 capable of switching between the coloration (color development) and the decoloration at any timing by the switching ON/OFF of the switch 25.

An average thickness of the first substrate 11 is set to preferably 0.1 mm or more and 10.0 mm or less, and more preferably 0.3 mm or more and 5.0 mm or less. By setting the average thickness of the first substrate 11 within such a range, it is possible to accurately suppress or prevent the electrochromic sheet 150 from deflection while achieving the thinning of the electrochromic sheet 150.

The second substrate 12 is disposed to face the first substrate 11, supports other members including the electrochromic element 60, constitutes an outermost layer of the electrochromic sheet 150, which allows other members including the electrochromic element 60 to be placed between the first substrate 11 and the second substrate 12, and has a function of protecting the electrochromic element 60.

In the electrochromic sheet 150, the first substrate 11 and the second substrate 12 constitute the outermost layers of the electrochromic sheet 150, so that the other members including the electrochromic element 60 are not exposed on the surface of the electrochromic sheet 150. Therefore, in a case where the bent sheet 120 in which the electrochromic sheet 150 is formed into a bent shape is applied as the component of the lens 30, it is possible to reliably prevent sand and dust, or the like from colliding with the electrochromic element 60, or the electrochromic element 60 from being abraded by the other members or the like. Therefore, it is possible to reliably prevent the collision or the friction from adversely affecting the characteristics of the electrochromic element 60.

In addition, the second substrate 12 can be formed of the same constituent material as those mentioned in the first substrate 11. The constituent material of the second substrate 12 and the constituent material of the first substrate 11 may be the same (or of the same type) or different from each other.

Furthermore, the second substrate 12 may or may not be stretched, similarly to the first substrate 11.

In addition, a refractive index of the second substrate 12 at a wavelength of 589 nm may be the same as or different from the refractive index n1 of the first substrate 11, and is preferably 1.3 or more and 1.8 or less and more preferably 1.4 or more and 1.65 or less. By setting the refractive index n2 of the second substrate 12 to the above-described numerical range, it is possible to accurately suppress or prevent the inhibition of the function as the electrochromic element 60 capable of switching between the coloration and the decoloration at any timing by the switching ON/OFF of the switch 25.

In addition, an average thickness of the second substrate 12 may be the same as or different from the average thickness the first substrate 11, and for example, it is preferably 0.1 mm or more and 10.0 mm or less and more preferably 0.3 mm or more and 5.0 mm or less. By setting the average thickness of the second substrate 12 within such a range, it is possible to accurately suppress or prevent the electrochromic sheet 150 from deflection while achieving the thinning of the electrochromic sheet 150.

The electrochromic element 60 is a light-emitting element in which the coloration (color development) and the decoloration can be switched at any timing by switching ON/OFF of the switch 25, and is provided in the colored region 70 defined by the sealing portion 55.

The electrochromic element 60 in the present embodiment includes a first electrode 13 and the first electrochromic layer 63, which are sequentially laminated on a first substrate 11 toward a second substrate 12 side, a second electrode 14 and a second electrochromic layer 64, which are sequentially laminated on the second substrate 12 toward the first substrate 11 side, and an electrolyte layer 65 which is filled between the first electrochromic layer 63 and the second electrochromic layer 64 (see FIG. 7).

The first electrode 13 and the second electrode 14 are each an electrode which supplies electrons between the first electrode 13 and the second electrode 14 or receives electrons from between the first electrode 13 and the second electrode 14, in a case where a positive voltage or a negative voltage is applied to the electrochromic element 60 by switching of the switch 25.

Constituent materials of the first electrode 13 and the second electrode 14 are not particularly limited as long as they are transparent conductive materials, and examples thereof include oxides such as indium tin oxide (ITO), F-doped tin oxide (FTO), antimony tin oxide (ATO), indium zinc oxide (IZO), $In_2O_3$, $SnO_2$, Sb-containing $SnO_2$, and Al-containing ZnO; and alloys containing Au, Pt, Ag, Cu, or these metals. Among these, one or two or more kinds thereof can be used in combination.

The first electrode 13 and the second electrode 14 are adjusted such that average thicknesses thereof are set to a value at which an electrical resistance value required for an oxidation-reduction reaction of the electrochromic layers 63 and 64 is obtained, and for example, in a case where ITO is used as the constituent material of the first electrode 13 and the second electrode 14, average thicknesses thereof are independently set to preferably approximately 50 nm or more and 200 nm or less, and more preferably about 100 nm or more and 150 nm or less.

The first electrochromic layer 63 is a layer in which a material exhibiting color by an oxidation reaction is contained as a main material, resulting in coloration.

The material exhibiting color by an oxidation reaction, contained as the main material in the first electrochromic layer 63, is not particularly limited, and examples thereof include a polymerized substance obtained by polymerizing a composition containing a radically polymerizable compound having a triarylamine, a bisacridine compound, a Prussian blue-type complex, and nickel oxide. Among these, one kind or two or more kinds thereof can be used in combination.

Examples of the polymerized substance obtained by polymerizing a composition containing a radically polymerizable compound having a triarylamine include polymerized substances described in JP2016-45464A, JP2020-138925A, and the like.

In addition, examples of the Prussian blue-type complex include a material consisting of $Fe(III)_4[Fe(II)(CN)_6]_3$.

Among these, from the viewpoint that the electrochromic element can be operated at a constant voltage, has excellent repetitive durability, and has high contrast, the polymerized substance obtained by polymerizing a composition containing a radically polymerizable compound having a triarylamine is particularly preferably used.

The composition containing a radically polymerizable compound having a triarylamine may contain another radically polymerizable compound different from the radically polymerizable compound having a triarylamine, and a polymerized substance obtained by polymerizing such a composition may be composed of a crosslinked substance in which these radically polymerizable compounds are cross-linked.

An average thickness of such a first electrochromic layer 63 is not particularly limited, but is preferably approximately 0.1 μm or more and 30 μm or less and more preferably approximately 0.4 μm or more and 10 μm or less.

The second electrochromic layer 64 is a layer in which an electrochromic material exhibiting color from transparent by a reduction reaction is contained as a main material, resulting in coloration.

It is preferable that the second electrochromic layer 64 uses an electrochromic material having the same color tone as the first electrochromic layer 63. As a result, the improvement of maximum color density is achieved, and the contrast can be improved.

In addition, in a case where a material having a different color tone is used, it is possible to realize color mixing. In addition, since the driving voltage of the electrochromic element 60 can be effectively reduced by the coloration with the oxidation reaction and the reduction reaction on both electrode sides of the first electrode 13 and the second electrode 14, the repetitive durability of the electrochromic element 60 can be improved.

The material exhibiting color by a reduction reaction, contained as the main material in the second electrochromic layer 64, is not particularly limited, and examples thereof include an inorganic electrochromic compound, an organic electrochromic compound, and a conductive polymer. Among these, one or two or more kinds thereof can be used in combination.

Examples of the inorganic electrochromic compound include tungsten oxide, molybdenum oxide, iridium oxide, and titanium oxide; and among these, tungsten oxide is preferable. The tungsten oxide is preferably used based on the fact that it has a decoloring electric potential due to a low reduction potential and has excellent durability because it is an inorganic material.

In addition, examples of the organic electrochromic compound include low-molecular-weight organic electrochromic compounds such as an azobenzene-based compound, an anthraquinone-based compound, a diarylethene-based compound, a dihydropyrene-based compound, a dipyridine-based compound, a styryl-based compound, a styrylspiropyran-based compound, a spirooxazine-based compound, a spirothiophene-based compound, a thioindigo-based compound, a tetrathiafulvalene-based compound, a terephthalic acid-based compound, a triphenylmethane-based compound, a triphenylamine-based compound, a naphthopyrane-based compound, a viologen-based compound, a pyrazoline-based compound, a phenazine-based compound, a phenylenediamine-based compound, a phenoxazine-based compound, a phenothiazine-based compound, a phthalocyanine-based compound, a fluoran-based compound, a fulgide-based compound, a benzopyrane-based compound, and a metallocene-based compound; and among these, a viologen-based compound or a dipyridine-based compound is preferable. Among these compounds, a compound having a low decoloring electric potential and exhibiting a favorable color value is preferably used.

Examples of the viologen-based compound include compounds described in JP3955641B, JP2007-171781A, and the like. In addition, examples of the dipyridine-based compound include compounds described in JP2007-171781A, JP2008-116718A, and the like.

Furthermore, examples of the conductive polymer include polypyrrole, polythiophene, polyaniline, and derivatives thereof.

An average thickness of such a second electrochromic layer 64 is not particularly limited, but is preferably approximately 0.2 μm or more and 5.0 μm or less and more preferably approximately 1.0 μm or more and 4.0 μm or less. In a case where the above-described average thickness is less than 0.2 μm, depending on the type of the electrochromic material, there is a concern that the color density is difficult to obtain, and in a case where the above-described average thickness exceeds 5.0 μm, manufacturing cost increases and, depending on the type of the electrochromic material, there is a concern that visibility is reduced by the coloration.

The electrolyte layer 65 is filled between the first electrochromic layer 63 and the second electrochromic layer 64, and contains an electrolyte having ion conductivity.

The electrolyte is not particularly limited, examples thereof include an inorganic ionic salt such as an alkali metal salt and an alkaline earth metal salt, a quaternary ammonium salt, an acid supporting electrolyte, and a base supporting electrolyte. Specific examples thereof include $LiClO_4$, $LiBF_4$, $LiAsF_6$, $LiPF_6$, $LiCF_2SO_3$, $LiCF_3COO$, KCl, $NaClO_3$, NaCl, $NaBF_4$, NaSCN, $KBF_4$, $Mg(ClO_4)_2$, and $Mg(BF_4)_2$; and one or two or more thereof can be used in combination.

In addition to these, as the material of the electrolyte, an ionic liquid can also be used. Among these ionic liquids, an organic ionic liquid is preferably used because it has a molecular structure exhibiting a liquid state in a wide temperature range including room temperature, and is easy to handle.

Examples of a cationic component in the molecular structure of the organic ionic liquid include imidazole derivatives such as an N, N-dimethylimidazole salt, an N, N-methylethylimidazole salt, and an N, N-methylpropylimidazole salt; pyridinium derivatives such as an N, N-dimethylpyridinium salt and an N, N-methylpropylpyridinium salt; and aliphatic quaternary ammonium salts such as a trimethylpropylammonium salt, a trimethylhexylammonium salt, and a triethylhexylammonium salt. In addition, as an anion component thereof, a compound containing fluorine is preferably used in consideration of stability in the atmosphere, and examples thereof include $BF_4^-$, $CF_3SO_3^-$, $PF_4^-$, and $(CF_3SO_2)_2N^-$.

As such a material of the electrolyte, an ionic liquid in which a cationic component and an anionic component are optionally combined is preferable.

The ionic liquid may be directly dissolved in any of a photopolymerizable monomer, an oligomer, or a liquid crystal material. In a case where solubility in these materials is poor, a solution obtained by dissolving the ionic liquid in a small amount of a solvent may be obtained, and then the solution may be mixed with any of the photopolymerizable monomer, the oligomer, or the liquid crystal material to be dissolved.

Examples of the solvent include propylene carbonate, acetonitrile, γ-butyrolactone, ethylene carbonate, sulfolane, dioxolane, tetrahydrofuran, 2-methyltetrahydrofuran, dimethyl sulfoxide, 1,2-dimethoxyethane, 1,2-ethoxymethoxyethane, polyethylene glycol, alcohols, and mixed solvents thereof.

The electrolyte layer 65 filled between the first electrochromic layer 63 and the second electrochromic layer 64 may have various forms such as a gel form, a polymer crosslinked form, and a liquid crystal dispersed form, in addition to the case in which the filled electrolyte is a low-viscosity liquid. Among these, the electrolyte is preferably formed in a gel form or a solid form. As a result, it is possible to improve element intensity of the electrochromic element 60, improve the reliability, and the like.

As a method of solidifying the electrolyte layer 65, for example, a method of holding a liquid containing the electrolyte and the solvent in a polymer resin is preferable. As a result, both high ion conductivity and high solid strength of the electrolyte layer 65 can be obtained. In addition, as the polymer resin, for example, a photocurable resin is preferable. As a result, the electrolyte layer 65, that is, the electrochromic element 60, which is in a solid form, can be obtained at low temperatures and in a short time as compared with a case of obtaining the electrolyte layer 65 in a solid form by thermal polymerization or by vaporization of a solvent.

An average thickness of the electrolyte layer 65 is not particularly limited, but is set to preferably approximately 20 μm or more and 100 μm or less and more preferably approximately 40 μm or more and 80 μm or less.

An interlayer such as an insulating porous layer and a protective layer may be provided in the respective layers between the first electrode 13 and the second electrode 14.

By configuring the electrochromic element 60 as described above, the coloration (color development) and decoloration can be switched at any timing by switching ON/OFF of the switch 25.

The sealing portion 55 is disposed between the first substrate 11 and the second substrate 12, defines the colored region 70, and has a function of sealing the electrochromic element 60 in the colored region 70.

A constituent material of the sealing portion 55 is not particularly limited as long as it is an insulating material having transparency, and examples thereof include a resin material such as an acrylic resin and an epoxy resin, and an inorganic oxide such as silicon oxide ($SiO_2$), silicon oxynitride (SiON), and aluminum oxide ($Al_2O_3$).

An average thickness of the sealing portion 55 is adjusted according to the average thickness of the electrochromic element 60, and is set to, for example, preferably approximately 20 μm or more and 100 μm or less and more preferably approximately 40 μm or more and 80 μm or less.

As described above, the electrochromic sheet 150 has a configuration in which the electrochromic element 60 is disposed in the colored region 70 defined by the sealing portion 55 between the first substrate 11 and the second substrate 12.

In the electrochromic sheet 150 having such a configuration, as shown in FIGS. 3 to 6, the first electrode 13 and the second electrode 14 included in the electrochromic element 60 are each formed into the lens 30 using the electrochromic sheet 150, and in a case where the lens 30 is mounted on the inside of the rim portion 21, the first electrode 13 and the second electrode 14 are drawn out as patterned wirings extending beyond (stretched) the colored region 70 defined by the sealing portion 55 at a position corresponding to the connection portion in which the bridge portion 22 and the temple portion 23 are connected to the rim portion 21 respectively.

As described above, the first conductive portion 17 is provided to fill a first hole portion 53 which is a through-hole penetrating the sealing portion 55 and is provided to overlap the first electrode 13 provided to extend from the colored region 70 as the wiring in a plan view. That is, the first electrode 13 provided between the first substrate 11 and the sealing portion 55 to the first conductive portion 17 and extending beyond the colored region 70 as the wiring reaches the first conductive portion 17.

The first conductive portion 17 is electrically connected to the first electrode 13 through the first auxiliary electrode 15, and the first conductive portion 17 is exposed at a position on the bridge portion 22 side (right side in FIGS. 3 and 4) in a case of being mounted on the inside of the rim portion 21, by forming the lens 30 using the electrochromic sheet 150 at the edge part of the first conductive portion 17 along the thickness direction of the electrochromic sheet 150.

In addition, the second conductive portion 18 is provided to fill a second hole portion 54 which is a through-hole penetrating the sealing portion 55 and is provided to overlap the second electrode 14 provided to extend from the colored region 70 as the wiring in a plan view. That is, the second electrode 14 provided between the second substrate 12 and the sealing portion 55 to the second conductive portion 18 and extending beyond the colored region 70 as the wiring reaches the second conductive portion 18.

The second conductive portion 18 is electrically connected to the second electrode 14 through the second auxiliary electrode 16, and the second conductive portion 18 is exposed at a position on the temple portion 23 side (left side in FIGS. 3 and 4) in a case of being mounted on the inside of the rim portion 21, by forming the lens 30 using the electrochromic sheet 150 at the edge part of the second conductive portion 18 along the thickness direction of the electrochromic sheet 150.

In this way, at the edge parts along the thickness direction of the electrochromic sheet 150, the first conductive portion 17 and the second conductive portion 18 are each exposed at different positions, such as the bridge portion 22 side and the temple portion 23 side, and the first conductive portion 17 and the second conductive portion 18 are electrically connected to the first electrode 13 and the second electrode 14 respectively.

Therefore, a voltage can be applied between the first electrode 13 and the second electrode 14 through the first conductive portion 17 and the second conductive portion 18 exposed at the edge parts along the thickness direction of the electrochromic sheet 150. That is, the first conductive portion 17 and the second conductive portion 18 can be used as terminals in a case where a voltage is applied between the first electrode 13 and the second electrode 14. Accordingly, by applying, after the above-described step [3] or after the above-described step [4], a voltage between the first electrode 13 and the second electrode 14 through the first conductive portion 17 and the second conductive portion 18, it is possible to easily perform the inspection of the electrochromic element 60 included in the inside of the inside of the electrochromic sheet 150. Therefore, it is possible to easily find out the presence or absence of the occurrence of the failure in the electrochromic element 60 provided in the inside of the electrochromic sheet 150.

Constituent materials of the first conductive portion 17 and the second conductive portion 18 are not particularly limited as long as they are conductive materials, and examples thereof include a conductive paste such as a silver paste, a metal such as gold and copper, and an alloy thereof.

In addition, average thicknesses of the first conductive portion 17 and the second conductive portion 18 are each independently set to preferably approximately 20 μm or more and 100 μm or less and more preferably approximately 40 μm or more and 80 μm or less. By setting the average thicknesses of the first conductive portion 17 and the second conductive portion 18 exposed at the edge parts along the thickness direction of the electrochromic sheet 150 within such a range, the first conductive portion 17 and the second conductive portion 18 can be easily used as terminals in a case where a voltage is applied between the first electrode 13 and the second electrode 14.

In the present invention, as described above, the first conductive portion 17 and the second conductive portion 18 are configured such that the edge parts formed along the thickness direction of the electrochromic sheet 150 are exposed at different positions in the plan view of the electrochromic sheet 150. The above-described exposure of the first conductive portion 17 and the second conductive portion 18 at the edge parts is achieved as follows. That is, in the above-described step [2], in a case of obtaining the electrochromic sheet 150 which is individualized to have a circular shape in a plan view by punching the element-sealing linking sheet 110 in the thickness direction thereof corresponding to each electrochromic element 60, the punching can be performed to pass through the first conductive portion 17 and the second conductive portion 18 in the plan view.

In addition, the first hole portion 53 and the second hole portion 54 may have a part of a wall portion (inner peripheral surface) missing due to the punching of the element-sealing linking sheet 110 which passes through the first conductive portion 17 and the second conductive portion 18, but in the present specification, this missing is also referred to as a hole portion.

Furthermore, in the present embodiment, both the first hole portion 53 and the second hole portion 54 are through-holes penetrating the sealing portion 55 in the thickness direction, but the present disclosure is not limited to this. For example, the first hole portion 53 may be formed from the first substrate 11 side toward the second substrate 12 side and may be configured such that the sealing portion 55 remains on the bottom portion; or the second hole portion 54 may be formed from the second substrate 12 side toward the first substrate 11 side and may be configured such that the sealing portion 55 remains on the top portion.

The third conductive portion 51 is provided to fill a third hole portion 57 which is a through-hole penetrating the sealing portion 55 at a position for, as a wiring, overlapping the first electrode 13 provided to extend from the colored region 70 in a plan view and at a position on the colored region 70 side (inner side) with respect to the first hole portion 53, that is, at a position between the first conductive portion 17 and the electrochromic element 60 in the plan view (see FIG. 4). The third conductive portion 51 is electrically connected to the first electrode 13 through the first auxiliary electrode 15.

The third conductive portion 51 is exposed at a position on the bridge portion 22 side (right side in FIGS. 5 and 6) in a case of the trimming processing of cutting an edge portion thereof, for the purpose of making the lens 30 obtained using the electrochromic sheet 150 (bent sheet 120) into a cut piece corresponding to the shape (lens shape) of the rim portion 21 to be mounted on the inside of the rim portion 21, as shown in FIGS. 5 and 6.

In addition, the fourth conductive portion 52 is provided to fill a fourth hole portion 58 which is a through-hole penetrating the sealing portion 55 at a position for, as a wiring, overlapping the second electrode 14 provided to extend from the colored region 70 in a plan view and at a position on the colored region 70 side (inner side) with respect to the second hole portion 54, that is, at a position between the second conductive portion 18 and the electrochromic element 60 in the plan view (see FIG. 4). The fourth conductive portion 52 is electrically connected to the second electrode 14 through the second auxiliary electrode 16.

The fourth conductive portion 52 is exposed at a position on the temple portion 23 side (left side in FIGS. 5 and 6) in a case of the trimming processing of cutting an edge portion thereof, for the purpose of making the lens 30 obtained using the electrochromic sheet 150 (bent sheet 120) into a cut piece corresponding to the shape of the rim portion 21 to be mounted on the inside of the rim portion 21, as shown in FIGS. 5 and 6.

As described above, in a case where the lens 30 is made into a cut piece by the trimming processing of cutting an edge portion thereof to be mounted on the inside of the rim portion 21, at the edge parts along the thickness direction of the electrochromic sheet 150 (bent sheet 120), the third conductive portion 51 and the fourth conductive portion 52 are each exposed at different positions, such as the bridge portion 22 side and the temple portion 23 side, and the third conductive portion 51 and the fourth conductive portion 52 are electrically connected to the first electrode 13 and the second electrode 14 respectively.

Therefore, in a case where the lens 30 (cutting piece) which has been subjected to the trimming processing is mounted on the inside of the rim portion 21, the third conductive portion 51 and the fourth conductive portion 52 each constitute a connection terminal electrically connected to the switch 25 and the battery 26 provided in the temple portion 23 through the wiring.

Constituent materials of the third conductive portion 51 and the fourth conductive portion 52 are not particularly limited as long as they are conductive materials, and the same materials as those mentioned as the constituent materials of the first conductive portion 17 and the second conductive portion 18 can be used.

In addition, average thicknesses of the third conductive portion 51 and the fourth conductive portion 52 are each independently set to preferably approximately 20 μm or more and 100 μm or less and more preferably approximately 40 μm or more and 80 μm or less. In the lens 30 which has been subjected to the trimming processing, by setting the average thicknesses of the third conductive portion 51 and the fourth conductive portion 52 exposed at the edge parts along the thickness direction of the electrochromic sheet 150 (bent sheet 120) within such a range, the third conductive portion 51 and the fourth conductive portion 52 can be easily used as the connection terminals to be electrically connected to the switch 25 and the battery 26 through the wiring.

By the trimming processing on the lens 30, the third hole portion 57 and the fourth hole portion 58 may have a part of a wall portion (inner peripheral surface) missing, but in the present specification, this missing is also referred to as a hole portion.

Furthermore, in the present embodiment, both the third hole portion 57 and the fourth hole portion 58 are through-holes penetrating the sealing portion 55 in the thickness direction, but the present disclosure is not limited to this. For example, the third hole portion 57 may be formed from the first substrate 11 side toward the second substrate 12 side and may be configured such that the sealing portion 55 remains on the bottom portion; or the fourth hole portion 58 may be formed from the second substrate 12 side toward the first substrate 11 side and may be configured such that the sealing portion 55 remains on the top portion.

In addition, in the present embodiment, the first hole portion 53 and the third hole portion 57, and the second hole portion 54 and the fourth hole portion 58 are provided as different hole portions, that is, as separate bodies with respect to the sealing portion 55, but the present invention is not limited thereto. For example, the first hole portion 53 and the third hole portion 57 may be configured by one hole portion integrally formed without the sealing portion 55 being interposed therebetween; or the second hole portion 54 and the fourth hole portion 58 may be configured by one hole portion integrally formed without the sealing portion 55 being interposed therebetween.

The first auxiliary electrode 15 is laminated and provided on the first electrode 13 provided to extend from the colored region 70 as the wiring on a surface of the first electrode 13 opposite to the first substrate 11, and is electrically connected to the first conductive portion 17 formed in the first hole portion 53 and the third conductive portion 51 formed in the third hole portion 57. That is, the first auxiliary electrode 15 which electrically connects the first electrode 13 to the first conductive portion 17 and the third conductive portion 51 is formed therebetween.

In addition, the second auxiliary electrode 16 is laminated and provided on the second electrode 14 provided to extend from the colored region 70 as the wiring on a surface of the second electrode 14 opposite to the second substrate 12, and is electrically connected to the second conductive portion 18 formed in the second hole portion 54 and the fourth conductive portion 52 formed in the fourth hole portion 58. That is, the second auxiliary electrode 16 which electrically connects the second electrode 14 to the second conductive portion 18 and the fourth conductive portion 52 is formed therebetween.

Each of the first auxiliary electrode 15 and the second auxiliary electrode 16 is set to have a resistance value lower than that of the first electrode 13 and the second electrode 14. Therefore, by configuring a laminated body of the first electrode 13 and the first auxiliary electrode 15 and a laminated body of the second electrode 14 and the second auxiliary electrode 16 to each have the wiring electrically connected to the electrochromic element. 60, it is possible to impart more excellent electrical conductivity to these wirings (laminated bodies).

Constituent materials of the first auxiliary electrode 15 and the second auxiliary electrode 16 are not particularly limited as long as they have a resistance value lower than that of the first electrode 13 and second electrode 14, and a constituent material having excellent conductivity is used. Examples thereof include silver, aluminum, copper, chromium, and molybdenum; and one or two or more thereof can be used in combination.

In addition, average thicknesses of the first auxiliary electrode 15 and the second auxiliary electrode 16 are each independently set to preferably approximately 1 nm or more and 100 nm or less and more preferably approximately 5 nm or more and 50 nm or less. As a result, a function as the auxiliary electrode can be reliably imparted to the first auxiliary electrode 15 and the second auxiliary electrode 16.

The total thickness of the electrochromic sheet 150 having such a configuration is not particularly limited, but is preferably 0.3 mm or more and 10.0 mm or less and more preferably 0.5 mm or more and 5.0 mm or less. As a result, it is possible to impart excellent thermoplasticity to the electrochromic sheet 150 in a case where the electrochromic sheet 150 is molded into the bent sheet 120 having a bent shape, while applying excellent strength to the electrochromic sheet 150.

Although the electrochromic sheet, the lens for eyeglasses, and the eyeglasses according to the embodiment of the present invention have been described above, the present invention is not limited thereto.

For example, each layer constituting the electrochromic element 60 included in the electrochromic sheet 150 can be replaced with a layer having any configuration which can exhibit the same function. In addition, the electrochromic sheet 150 may further include another layer such as an interlayer, between the substrates 11 and 12 and the electrochromic element 60.

INDUSTRIAL APPLICABILITY

According to the present invention, in the electrochromic sheet including the electrochromic element, the first conductive portion and the second conductive portion, which are electrically connected to the first electrode and the second electrode included in the electrochromic element, are each exposed at different positions at edge parts along a thickness direction of the electrochromic sheet. Therefore, in the middle of manufacturing of a lens for eyeglasses, by applying a voltage between the first electrode and the second electrode through the first conductive portion and the second conductive portion, it is possible to easily find out the presence or absence of occurrence of a failure in the electrochromic element provided in the electrochromic sheet. That is, the electrochromic element can be easily examined in the middle of the manufacturing of the lens for eyeglasses. Accordingly, the present invention has industrial applicability.

REFERENCE SIGNS LIST

11: first substrate
12: second substrate
13: first electrode
14: second electrode
15: first auxiliary electrode
16: second auxiliary electrode
17: first conductive portion
18: second conductive portion
20: frame
21: rim portion
22: bridge portion
23: temple portion
24: nose pad portion
25: switch
26: battery
30: lens
35: resin layer
40: mold
50: protective film
51: third conductive portion
52: fourth conductive portion
53: first hole portion
54: second hole portion
55: sealing portion
57: third hole portion
58: fourth hole portion
60: electrochromic element
63: first electrochromic layer
64: second electrochromic layer
65: electrolyte layer
70: colored region
100: sunglasses
110: element-sealing linking sheet
120: bent sheet
150: electrochromic sheet

210: coupling sheet laminate

220: bent element laminate

250: element laminate

The invention claimed is:

1. An electrochromic sheet comprising:

a first substrate;

a second substrate which is disposed to face the first substrate;

a sealing portion which is disposed between the first substrate and the second substrate and defines a colored region exhibiting coloration by application of a voltage;

an electrochromic element which is disposed in the colored region; and on an outer side of the sealing portion with respect to the electrochromic element, a first conductive portion which is provided to fill a first hole portion formed from the first substrate side toward the second substrate side, and a second conductive portion which is provided to fill a second hole portion formed from the second substrate side toward the first substrate side, wherein the electrochromic element includes a first electrode and a first electrochromic layer, which are sequentially laminated on the first substrate toward the second substrate side, a second electrode and a second electrochromic layer, which are sequentially laminated on the second substrate toward the first substrate side, and an electrolyte layer which is filled between the first electrochromic layer and the second electrochromic layer, wherein the first electrochromic layer contains, as a main material, a material exhibiting coloration by an oxidation reaction, wherein the second electrochromic layer contains, as a main material, a material exhibiting coloration by a reduction reaction, wherein the first electrode is provided between the first substrate and the sealing portion to the first conductive portion with a patterning that, in a plan view of the electrochromic sheet, the first electrode extends from the colored region and reaches to the first conductive portion to be electrically connected to the first conductive portion, wherein the second electrode is provided between the second substrate and the sealing portion to the second conductive portion with a patterning that, in the plan view of the electrochromic sheet, the second electrode extends from the colored region and reaches to the second conductive portion to be electrically connected to the second conductive portion, and wherein the first conductive portion and the second conductive portion are each exposed at different positions at edge parts along a thickness direction of the electrochromic sheet.

2. The electrochromic sheet according to claim 1, further comprising:

in the plan view of the electrochromic sheet, a third conductive portion which is provided to fill a third hole portion formed from the first substrate side toward the second substrate side between the first conductive portion and the electrochromic element, wherein the first electrode is further electrically connected to the third conductive portion.

3. The electrochromic sheet according to claim 2, further comprising:

a first auxiliary electrode which is provided between the first electrode and the first conductive portion to the third conductive portion to electrically connect the first electrode to the first conductive portion and the third conductive portion.

4. The electrochromic sheet according to claim 2, wherein the first hole portion and the third hole portion are through-holes penetrating the sealing portion in the thickness direction.

5. The electrochromic sheet according to claim 1, further comprising:

in the plan view of the electrochromic sheet, a fourth conductive portion which is provided to fill a fourth hole portion formed from the second substrate side toward the first substrate side between the second conductive portion and the electrochromic element, wherein the second electrode is further electrically connected to the fourth conductive portion.

6. The electrochromic sheet according to claim 5, further comprising:

a second auxiliary electrode which is provided between the second electrode and the second conductive portion to the fourth conductive portion to electrically connect the second electrode to the second conductive portion and the fourth conductive portion.

7. The electrochromic sheet according to claim 5, wherein the second hole portion and the fourth hole portion are through-holes penetrating the sealing portion in the thickness direction.

8. The electrochromic sheet according to claim 1, wherein the first conductive portion and the second conductive portion each independently have an average thickness of 20 μm or more and 100 μm or less.

9. The electrochromic sheet according to claim 1, wherein the first electrode and the second electrode each independently have an average thickness of 50 nm or more and 200 nm or less.

10. A lens for eyeglasses, comprising:

the electrochromic sheet according to claim 1, wherein the electrochromic sheet is provided as a cut piece which has been formed into a bent shape and cut out to correspond a lens shape.

11. Eyeglasses comprising:

the lens for eyeglasses according to claim 10.

* * * * *